US012753830B1

(12) United States Patent
de Paula

(10) Patent No.: US 12,753,830 B1
(45) Date of Patent: Oct. 6, 2026

(54) BALL SCREW ASSEMBLY HAVING A DEFLECTOR

(71) Applicant: Schaeffler Technologies AG & Co. KG, Herzogenaurach (DE)

(72) Inventor: Renato de Paula, Sterling Heights, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 19/250,477

(22) Filed: Jun. 26, 2025

(51) Int. Cl.
*F16H 25/22* (2006.01)

(52) U.S. Cl.
CPC ................................ *F16H 25/2223* (2013.01)

(58) Field of Classification Search
CPC .................................................. F16H 25/2223
See application file for complete search history.

(56) References Cited

U.S. PATENT DOCUMENTS 3,699,823 A 10/1972 Nilsson
4,905,534 A * 3/1990 Andonegui ......... F16H 25/2223 74/424.87
5,005,436 A 4/1991 Brusasco
5,373,755 A 12/1994 Rohlinger
5,711,188 A 1/1998 Miyaguchi et al.
5,855,142 A 1/1999 Bodtker et al.
5,937,700 A 8/1999 Brown et al.
6,439,338 B2 * 8/2002 Yoshioka ............ B62D 5/0448 180/444
8,984,979 B2 3/2015 Allegri et al.
11,572,937 B2 * 2/2023 Schadlich ........... F16H 25/2228
2011/0146436 A1 6/2011 Brown
2021/0088116 A1 3/2021 Pfeffer et al.

FOREIGN PATENT DOCUMENTS

DE 202023107167 U1 * 4/2024 ......... F16H 25/2223
JP 2003156118 A * 5/2003 ......... F16H 25/2223
JP 2012082900 A * 4/2012

* cited by examiner

*Primary Examiner* — Jake Cook

(74) *Attorney, Agent, or Firm* — Price Heneveld LLP

(57) ABSTRACT

A ball screw assembly includes a ball screw nut having an inner surface that defines a hollow, an outer surface opposite the inner surface, and a port that defines an opening that extends through the ball screw nut from the outer surface to the inner surface. A deflector includes a body that defines a recirculation passage. First and second resilient fingers are coupled to the body. The deflector is operable to move from an uninserted position, wherein the deflector is disposed outside of the opening, to an inserted position, wherein the deflector extends within the opening. With movement of the deflector from the uninserted position to the inserted position, the fingers are elastically deformed from at-rest conditions to compressed conditions due to contact between the fingers and the port, and, subsequently, the fingers rebound back toward the at-rest conditions within the hollow as the deflector enters the inserted position.

19 Claims, 9 Drawing Sheets

BALL SCREW ASSEMBLY HAVING A DEFLECTOR

FIELD OF THE DISCLOSURE

The present disclosure generally relates to a ball screw assembly. More specifically, the present disclosure relates to a ball screw assembly that includes a ball screw nut and a deflector that is configured to be inserted into the ball screw nut to allow for internal recirculation of rollers of the ball screw assembly.

BACKGROUND OF THE DISCLOSURE

Internal recirculation ball screw assemblies are known.

SUMMARY OF THE DISCLOSURE

According to a first aspect of the present disclosure, a ball screw assembly includes a ball screw nut having an inner surface that defines a hollow and includes a groove configured to define a raceway for a plurality of rollers and an outer surface opposite the inner surface, wherein the ball screw nut includes a port that defines an opening that extends through the ball screw nut from the outer surface of the ball screw nut to the inner surface. A deflector includes a body that defines a recirculation passage, a first resilient finger coupled to the body, and a second resilient finger coupled to the body. The deflector is operable to move from an uninserted position, wherein the deflector is disposed outside of the opening defined by the port of the ball screw nut, the first resilient finger is in an at-rest condition, and the second resilient finger is in an at-rest condition, to an inserted position, wherein the deflector extends within the opening defined by the port of the ball screw nut, the first resilient finger abuts a first portion of the groove of the inner surface of the ball screw nut, the second resilient finger abuts a second portion of the groove of the inner surface of the ball screw nut, and the deflector is positioned to recirculate the plurality of rollers, via the recirculation passage, along a portion of the groove disposed between the first and second portions of the groove. Movement of the deflector from the uninserted position to the inserted position prompts elastic deformation of the first and second resilient fingers from the at-rest conditions to compressed conditions due to contact between the ball screw nut and the first and second resilient fingers.

Embodiments of the first aspect of the disclosure can include any one or a combination of the following features:

- the first and second resilient fingers return to the at-rest conditions when the deflector reaches the inserted position;
- a ball screw spindle extends within the hollow and includes a groove that cooperates with the groove of the inner surface of the ball screw nut to define the raceway, the ball screw spindle being operable to rotate about an axis, wherein rotation of the ball screw spindle about the axis drives circulation of the plurality of rollers along a roller path that includes the recirculation passage defined by the deflector and a portion of the raceway defined by the portion of the groove of the inner surface of the ball screw nut;
- the deflector moves radially inboard from the uninserted position to the inserted position, and wherein, in the inserted position of the deflector, contact between the first and second resilient fingers and the groove of the inner surface of the ball screw nut restricts radially-outboard movement of the deflector to the uninserted position;
- the body includes a head that contacts the ball screw nut in the inserted position of the deflector, such that radially-inboard movement of the deflector in the inserted position is restricted;
- in the inserted position of the deflector, the body of the deflector extends axially beyond the first resilient finger in a first axial direction and a second axial direction opposite the first axial direction;
- in the inserted position of the deflector, the body of the deflector extends axially beyond the second resilient finger in the first axial direction and the second axial direction;
- in the inserted position of the deflector, a portion of the body of the deflector is disposed within the hollow defined by the inner surface of the ball screw nut, and the portion of the body of the deflector extends axially beyond the first and second resilient fingers in the first and second axial directions; and
- the deflector is a single unitary body.

According to a second aspect of the present disclosure, a ball screw assembly includes a ball screw spindle operable to rotate about an axis and having a groove that extends along an outer surface of the ball screw spindle. A ball screw nut is disposed about the ball screw spindle and includes an inner surface that defines a hollow and that includes a corresponding groove that cooperates with the groove of the ball screw spindle to define a raceway between the ball screw spindle and the ball screw nut. The ball screw nut has an outer surface opposite the inner surface, wherein the ball screw nut includes a port that defines an opening that extends through the ball screw nut from the outer surface of the ball screw nut to the inner surface. The ball screw assembly includes a plurality of rollers and a deflector that includes a body that defines a recirculation passage and includes a head. A first resilient finger is coupled to the body, and a second resilient finger is coupled to the body. The deflector is disposed in an inserted position, wherein the deflector extends within the opening defined by the port of the ball screw nut, the head of the body is operable to interfere with the ball screw nut to limit radially-inboard movement of the deflector, and the first and second resilient fingers are operable to interfere with the inner surface of the ball screw nut to limit radially-outboard movement of the deflector. Rotation of the ball screw spindle about the axis drives circulation of the plurality of rollers along a roller path that includes the recirculation passage defined by the deflector and a portion of the raceway, and axial movement of the ball screw nut along the ball screw spindle.

Embodiments of the second aspect of the disclosure can include any one or a combination of the following features:

- in the inserted position of the deflector, the body of the deflector extends axially beyond the first resilient finger in a first axial direction and a second axial direction opposite the first axial direction;
- in the inserted position of the deflector, the body of the deflector extends axially beyond the second resilient finger in the first axial direction and the second axial direction opposite the first axial direction;
- in the inserted position of the deflector, a portion of the body of the deflector is disposed within the hollow defined by the inner surface of the ball screw nut, and the portion of the body of the deflector extends axially beyond the first and second resilient fingers in the first and second axial directions;

the first and second resilient fingers are operable to pivot relative to the body inward toward the body to a compressed condition; and the deflector is a single unitary body.

According to a third aspect of the present disclosure, a ball screw assembly includes a ball screw nut having an inner surface that defines a hollow, an outer surface opposite the inner surface, and a port that defines an opening that extends through the ball screw nut from the outer surface to the inner surface. A deflector includes a body that defines a recirculation passage and first and second resilient fingers coupled to the body. The deflector is operable to move from an uninserted position, wherein the deflector is disposed outside of the opening, to an inserted position, wherein the deflector extends within the opening. With movement of the deflector from the uninserted position to the inserted position, the first and second resilient fingers are elastically deformed from at-rest conditions to compressed conditions due to contact between the first and second resilient fingers and the port, and, subsequently, the first and second resilient fingers rebound back toward the at-rest conditions within the hollow as the deflector enters the inserted position.

Embodiments of the third aspect of the disclosure can include any one or a combination of the following features:

the deflector is a single unitary body;

the body includes a head that is operable to interfere with the ball screw nut to limit movement of the deflector into the hollow beyond the inserted position;

the first and second resilient fingers rebound back to the at-rest conditions in the inserted position; and in the inserted position of the deflector, the first and second resilient fingers abut the inner surface of the ball screw nut to restrict movement of the deflector toward the uninserted position.

These and other features, advantages, and objects of the present disclosure will be further understood and appreciated by those skilled in the art by reference to the following specification, claims, and appended drawings.

Figure 1:
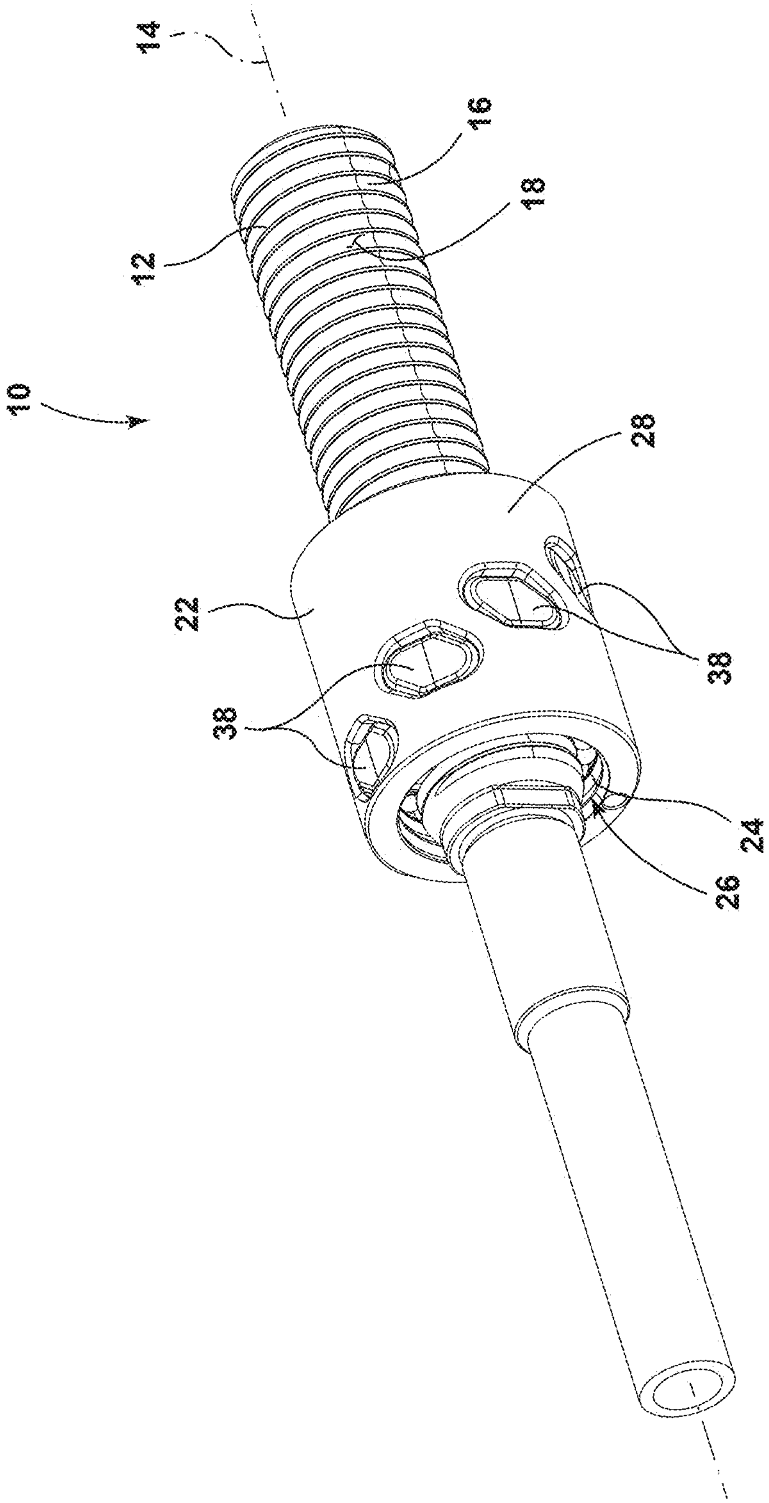
FIG. 1 is a perspective view of a ball screw assembly, illustrating a ball screw spindle, a ball screw nut, and a plurality of deflectors that are received within a corresponding plurality of openings defined by the ball screw nut, according to one embodiment.

The components in the figures are not necessarily to scale, emphasis instead being placed upon illustrating the principles described herein.

DETAILED DESCRIPTION

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein, the term "axial" and derivatives thereof, such as "axially," shall be understood to refer to a direction along an axis about which a ball screw spindle is configured to rotate in operation of the apparatus described herein. Further, the term "radial" and derivatives thereof, such as "radially," shall be understood in relation to the axis of the aforementioned spindle. For example, "radially outboard" refers to further away from the axis, while "radially inboard" refers to nearer to the axis. The term "circumferential" and derivatives thereof, such as "circumferentially," shall be understood in relation to the axis of the aforementioned spindle.

Figure 2:
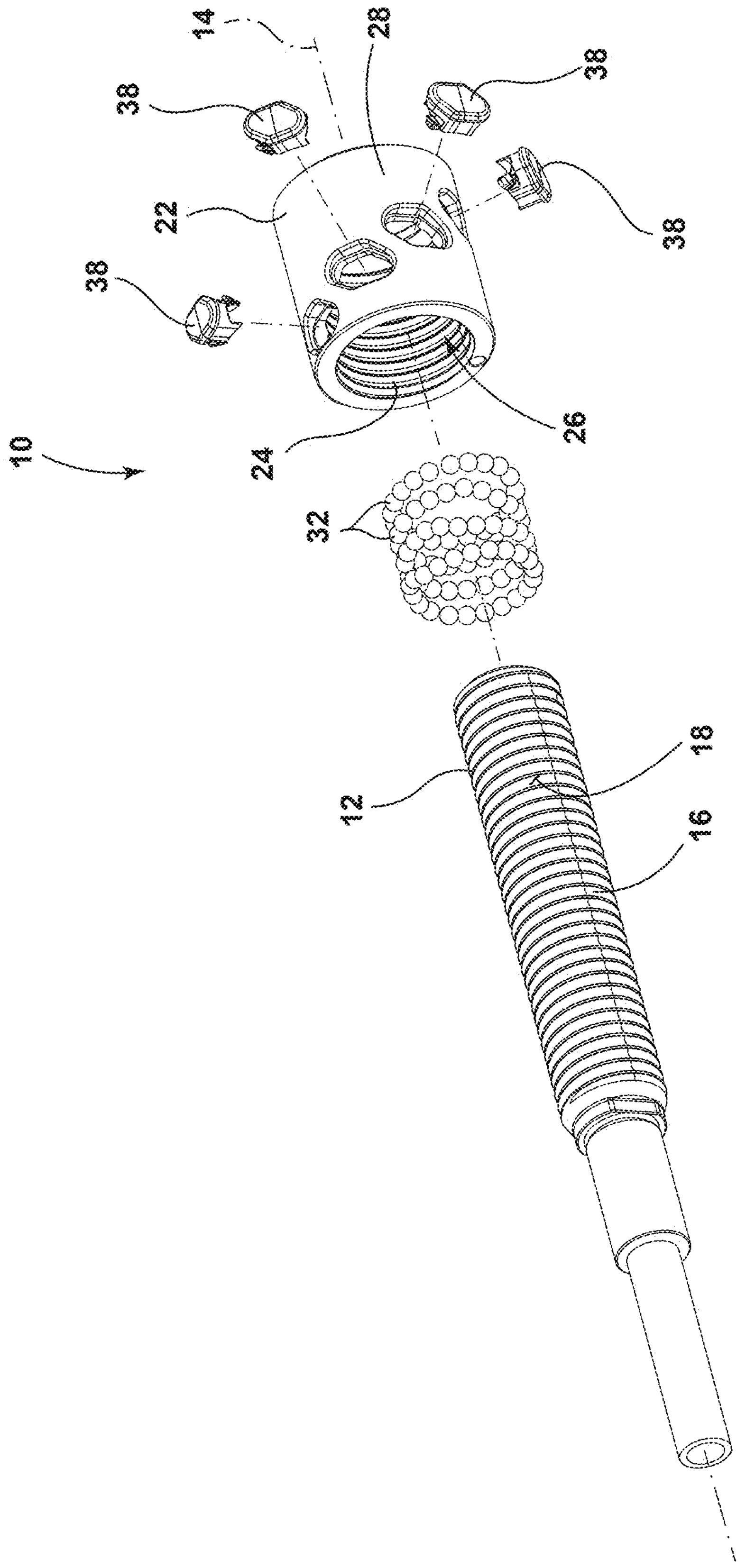
FIG. 2 is an exploded perspective view of the ball screw assembly, illustrating the ball screw spindle, the ball screw nut, the plurality of deflectors, and a plurality of rollers, according to one embodiment.

Referring now to FIGS. 1 and 2, a ball screw assembly 10 includes a ball screw spindle 12. The ball screw spindle 12 is operable to rotate about an axis 14 in operation of the ball screw assembly 10. As illustrated in FIGS. 1 and 2, an outer surface 16 of the ball screw spindle 12 may include a groove 18. In the illustrated embodiment, the groove 18 is a helical groove that extends along the outer surface 16 of the ball screw spindle 12. The groove 18 may be configured to define a raceway 20 of the ball screw assembly 10, as described further herein.

Figure 6:
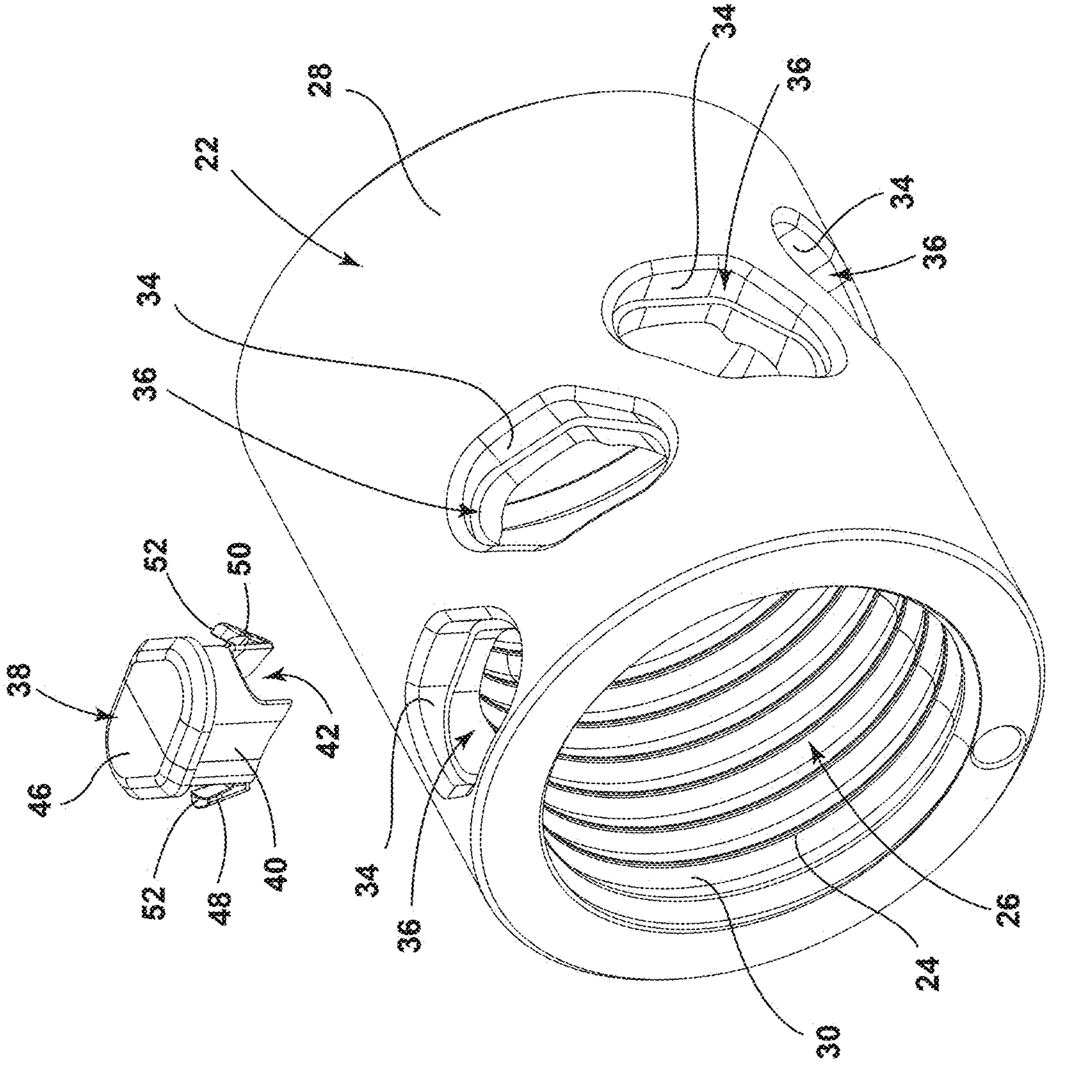
FIG. 6 is a perspective view of a ball screw nut and a deflector in an uninserted position relative to the ball screw nut, wherein the first and second resilient fingers of the deflector are in at-rest conditions, according to one embodiment.
Figure 10:
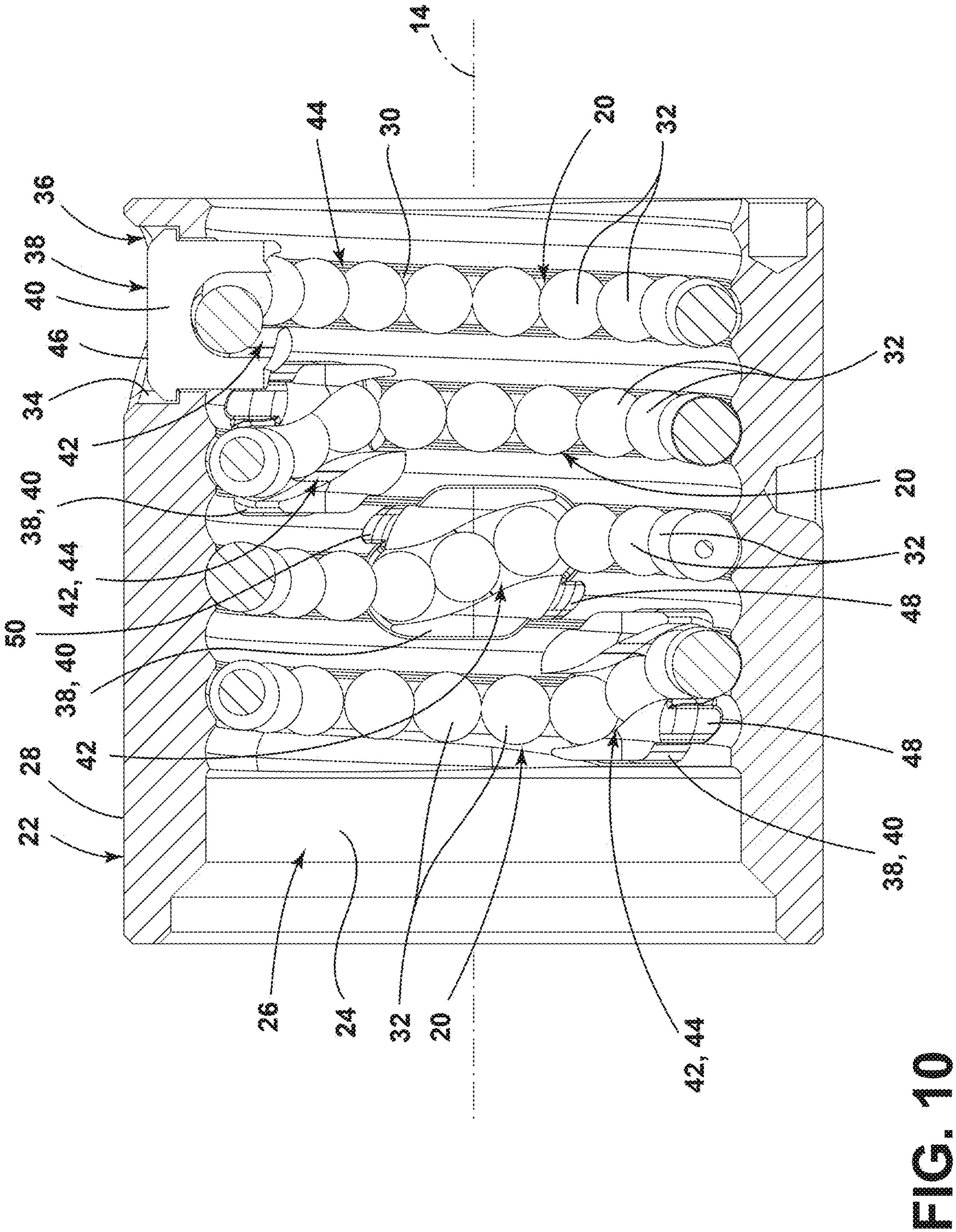
FIG. 10 is a cross-sectional view of a ball screw nut, a plurality of deflectors, and pluralities of rollers of a ball screw assembly, according to one embodiment.

Referring now to FIGS. 1, 2, 6, and 10, the ball screw assembly 10 includes a ball screw nut 22. The ball screw nut 22 may be disposed about the ball screw spindle 12, as illustrated exemplarily in FIG. 1. In various embodiments, the ball screw nut 22 includes an inner surface 24 that defines a hollow 26 and an outer surface 28 that is opposite the inner surface 24. As illustrated in FIG. 6, the inner surface 24 of the ball screw nut 22 may include a groove 30, such as a helical groove. The groove 30 of the inner surface 24 of the ball screw nut 22 may correspond with the groove 18 of the outer surface 16 of the ball screw spindle 12 to define the raceway 20. As illustrated in FIG. 10, a plurality of rollers 32 may circulate within at least a portion of the raceway 20, as described further herein. As illustrated in FIGS. 1, 2, and 6, the ball screw nut 22 may include a port 34 that defines an opening 36 that extends through the ball screw nut 22 from the outer surface 28 of the ball screw nut 22 to the inner surface 24 of the ball screw nut 22. In various embodiments, the opening 36 extends radially-inboard from the outer surface 28 of the ball screw nut 22 to the inner surface 24 of the ball screw nut 22. In some embodiments, the ball screw nut 22 may include a plurality of ports 34 that define a corresponding plurality of openings 36. For example, as illustrated in FIGS. 2 and 6, the ball screw nut 22 defines a plurality of ports 34 that define a corresponding plurality of openings 36 that extend from the outer surface 28 of the ball screw nut 22 to the inner surface 24 of the ball screw nut 22.

Referring now to FIGS. 1-10, in various embodiments, the ball screw assembly 10 includes a deflector 38. The deflector 38 may be configured to be inserted into the opening 36 defined by the port 34 of the ball screw nut 22 of the ball screw assembly 10 in an assembled condition of the ball screw assembly 10, as illustrated exemplarily in FIG. 1. In some embodiments, the ball screw assembly 10 may include a plurality of deflectors 38. For example, in the embodiment illustrated in FIGS. 1, 2, and 10, the ball screw assembly 10 includes a plurality of deflectors 38 that are configured to be inserted into a corresponding plurality of openings 36 that are defined by a plurality of ports 34 of the ball screw nut 22.

Figure 3:
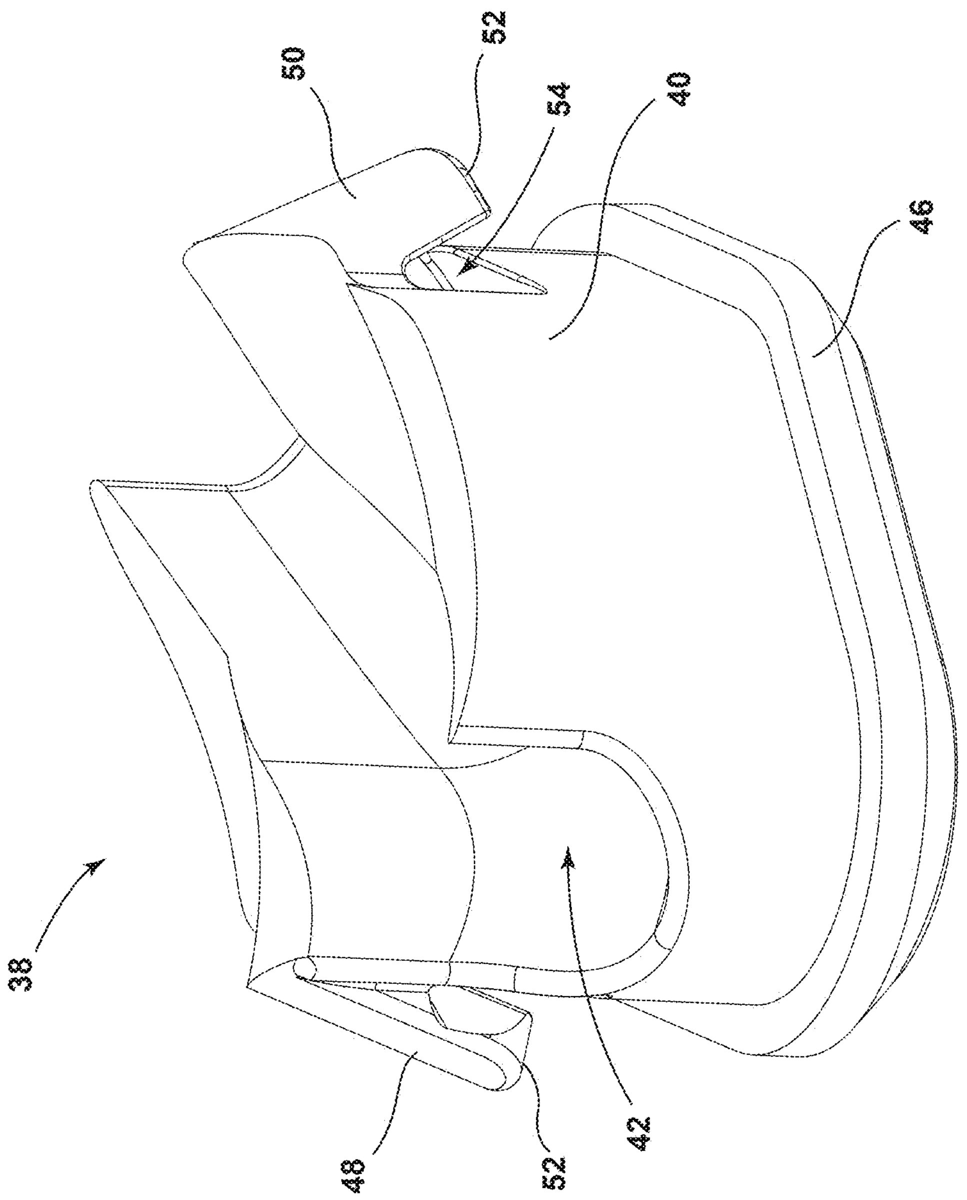
FIG. 3 is a perspective view of a deflector, illustrating a body of the deflector that defines a recirculation passage and includes a head, and first and second resilient fingers that are coupled to the body of the deflector, according to one embodiment.

The deflector 38 includes a body 40. The body 40 of the deflector 38 defines a recirculation passage 42. The recirculation passage 42 may be configured to recirculate rollers 32 within a roller path 44 of the ball screw assembly 10, as described further herein. As illustrated in FIG. 10, the recirculation passage 42 is defined on a radially-inboard side of the body 40 of the deflector 38. In the illustrated embodiment, the recirculation passage 42 resembles a radially-inboard facing channel that is wide enough to accommodate rollers 32 of the ball screw assembly 10. As illustrated in FIG. 3, the body 40 of the deflector 38 includes a head 46. The head 46 may be disposed proximate to a radially-outboard end of the deflector 38 and may be configured to restrict radially-inboard movement of the deflector 38 beyond the inserted position via interference with the port 34 of the ball screw nut 22, as described further herein.

Figure 5:
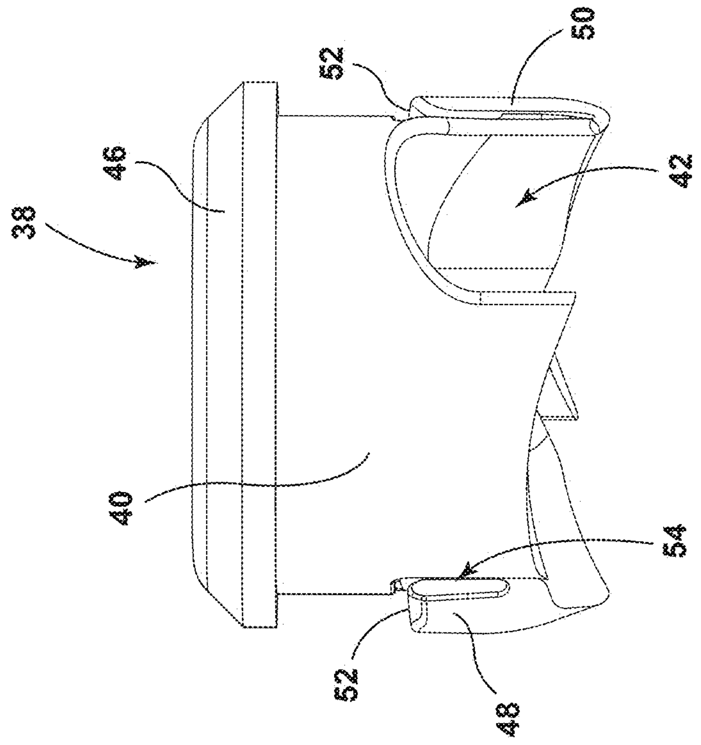
FIG. 5 is an elevational view of the deflector, illustrating the first and second resilient fingers in compressed conditions, according to one embodiment.
Figure 4:
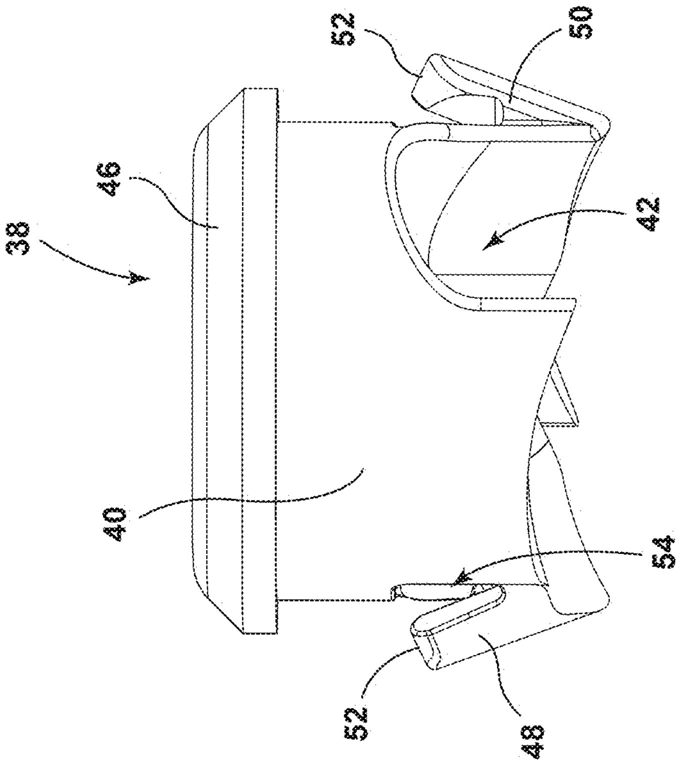
FIG. 4 is an elevational view of the deflector of FIG. 3, illustrating the first and second resilient fingers in at-rest conditions, according to one embodiment.

Referring now to FIGS. 3-5, in various implementations, the deflector 38 includes a first resilient finger 48 and a second resilient finger 50. The first and second resilient fingers 48, 50 may be coupled to the body 40 of the deflector 38, as illustrated in FIG. 3. In various embodiments, the first and second resilient fingers 48, 50 may be operable between at-rest conditions, as illustrated exemplarily in FIG. 4, and compressed conditions, as illustrated exemplarily in FIG. 5. In the illustrated embodiment, the first and second resilient fingers 48, 50 are coupled to portions of the body 40 that are on opposite axial sides of the recirculation passage 42, respectively. As illustrated in FIG. 4, the first and second resilient fingers 48, 50 angle outward from the body 40 and nearer to the head 46 of the body 40 to distal ends 52 of the first and second resilient fingers 48, 50, respectively. Further, the body 40 of the deflector 38 may include one or more recesses 54 that are configured to receive the first and/or second resilient fingers 48, 50 therein in the compressed condition. As illustrated in FIG. 5, in the compressed conditions of the first and second resilient fingers 48, 50, the first and second resilient fingers 48, 50 are elastically deformed toward the body 40, such that the distal ends 52 of the first and second resilient fingers 48, 50 are nearer to the body 40, and the first and second resilient fingers 48, 50 are received within the recesses 54 defined by the body 40. In some embodiments, the deflector 38 is a single unitary body. For example, the deflector 38 may be an integrally formed metal or plastic component, such that the first and second resilient fingers 48, 50 are integrally coupled with the body 40 of the deflector 38.

Figure 7:
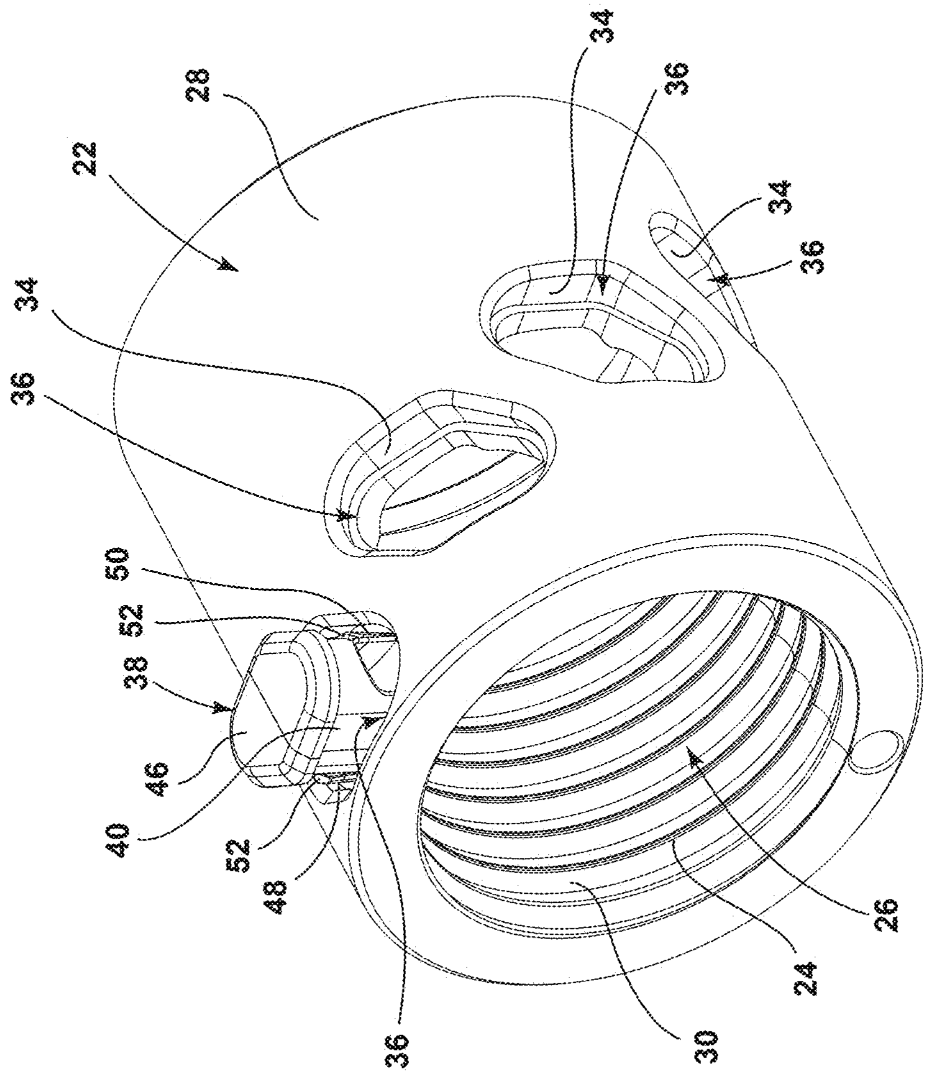
FIG. 7 is a perspective view of the ball screw nut and the deflector, illustrating the deflector partially inserted into an opening defined by the ball screw nut, such that the first and second resilient fingers of the deflector are compressed toward the body of the deflector due to contact between the ball screw nut and the first and second resilient fingers, according to one embodiment.
Figure 8:
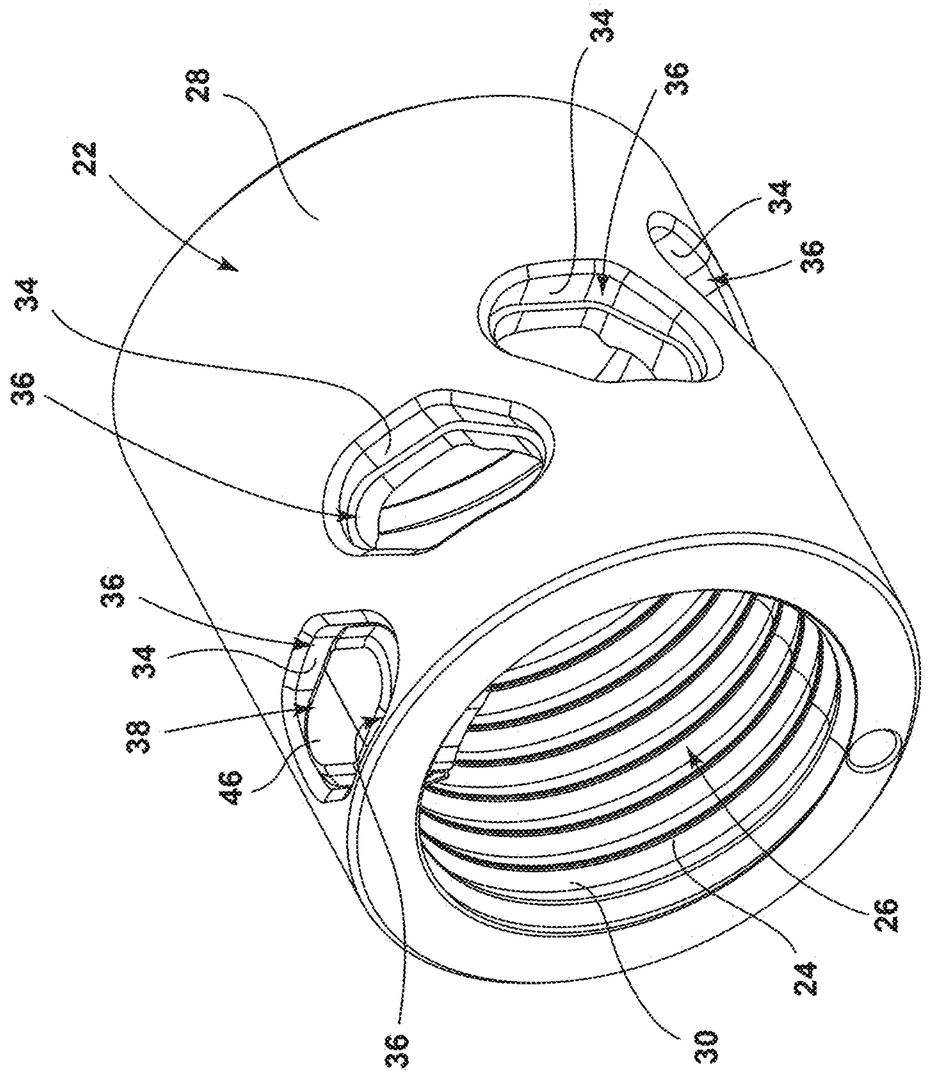
FIG. 8 is a perspective view of the ball screw nut and the deflector, illustrating the deflector in the inserted position, according to one embodiment.
Figure 9:
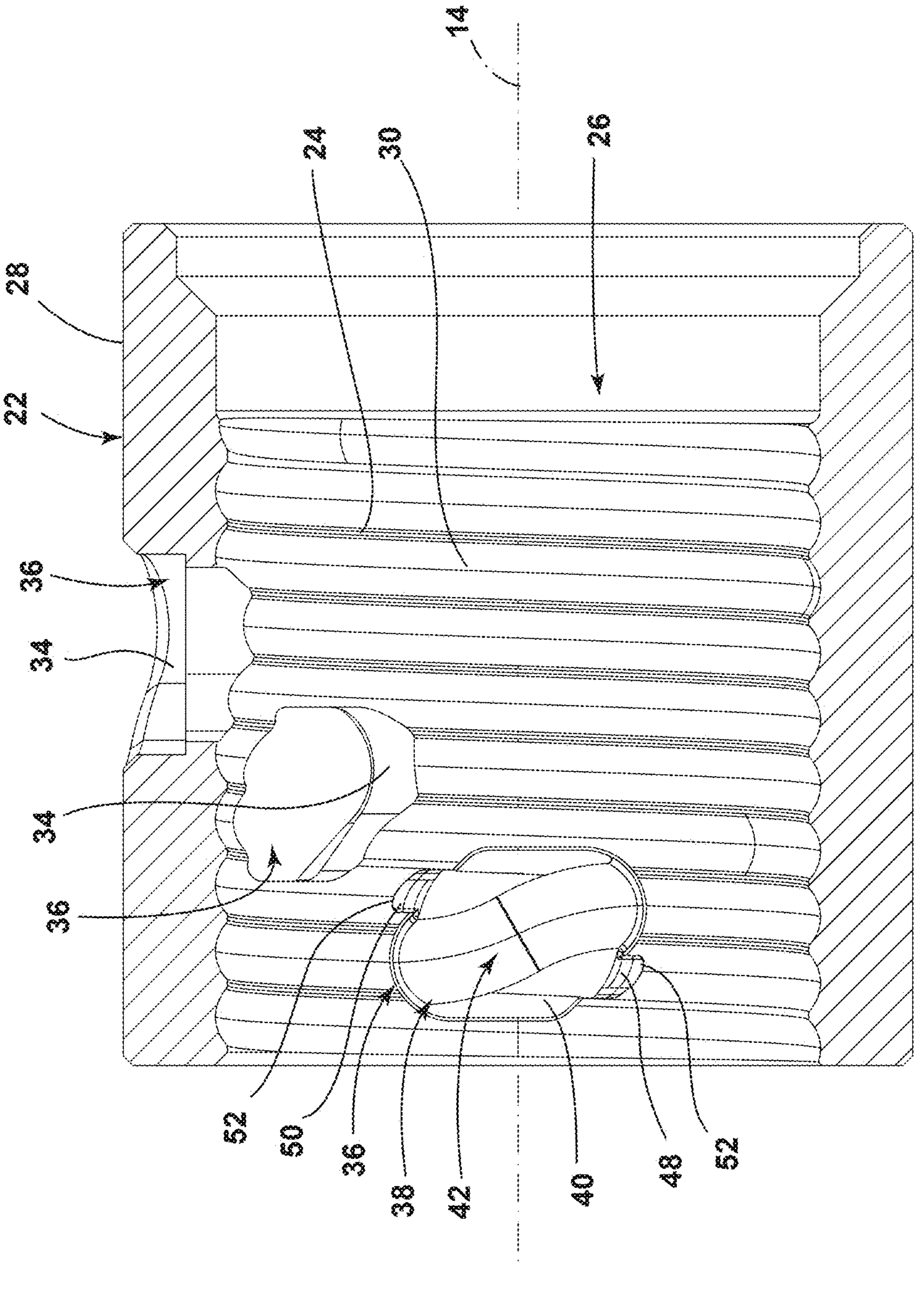
FIG. 9 is a cross-sectional view of the ball screw nut of FIG. 8, illustrating the deflector in the inserted position, wherein the first and second resilient fingers are shown, rebounded back toward the at-rest conditions from the compressed conditions, according to one embodiment.

Referring now to FIGS. 4-9, in various embodiments, the deflector 38 is operable to move from an uninserted position, as illustrated exemplarily in FIG. 5, to an inserted position, as illustrated exemplarily in FIGS. 8 and 9. In the uninserted position, the deflector 38 is disposed outside of the opening 36 defined by the port 34 of the ball screw nut 22. Further, the first resilient finger 48 is in the at-rest condition and the second resilient finger 50 is in the at-rest condition in the uninserted position of the deflector 38. In various embodiments, in the inserted position of the deflector 38, the deflector 38 extends within the opening 36 defined by the port 34 of the ball screw nut 22, as illustrated in FIG. 8. In some embodiments, in the inserted position of the deflector 38, the first resilient finger 48 abuts a first portion of the groove 30 of the inner surface 24 of the ball screw nut 22, and the second resilient finger 50 abuts a second portion of the groove 30 of the inner surface 24 of the ball screw nut 22, as illustrated in FIG. 9. In various implementations, in the inserted position of the deflector 38, the deflector 38 is positioned to recirculate a plurality of rollers 32 via the recirculation passage 42 defined by the body 40 of the deflector 38, along a portion of the groove 30 of the inner surface 24 of the ball screw nut 22 that is disposed between the first and second portions of the groove 30 that the first and second resilient fingers 48, 50 respectively abut. In some embodiments, the first and second resilient fingers 48, 50 may be in the at-rest conditions when the deflector 38 is in the inserted position. In some embodiments, in the inserted position of the deflector 38, contact between the first and second resilient fingers 48, 50 and the groove 30 of the inner surface 24 of the ball screw nut 22 restricts radially-outboard movement of the deflector 38 to the uninserted position.

As illustrated in FIGS. 8 and 10, in the inserted position of the deflector 38, the head 46 of the body 40 may contact the ball screw nut 22, such that radially-inboard movement of the deflector 38 in the inserted position of the deflector 38 is restricted. For example, in various implementations, the head 46 is operable to interfere with the ball screw nut 22 to limit movement of the deflector 38 into the hollow 26 defined by the inner surface 24 of the ball screw nut 22 beyond the inserted position of the deflector 38. In an exemplary embodiment of the ball screw assembly 10, in the inserted position of the deflector 38, the deflector 38 extends within the opening 36 defined by the port 34 of the ball screw nut 22, the head 46 of the body 40 of the deflector 38 is operable to interfere with the ball screw nut 22 to limit radially-inboard movement of the deflector 38, and the first and second resilient fingers 48, 50 are operable to interfere with the inner surface 24 of the ball screw nut 22 to limit radially-outboard movement of the deflector 38.

As illustrated in FIG. 9, in some implementations, in the inserted position of the deflector 38, the body 40 of the deflector 38 extends axially beyond the first resilient finger 48 in a first axial direction and a second axial direction that is opposite the first axial direction. In some embodiments, in the inserted position of the deflector 38, the body 40 of the deflector 38 extends axially beyond the second resilient finger 50 in the first axial direction and the second axial direction that is opposite the first axial direction. In the embodiment illustrated in FIG. 9, a portion of the body 40 of the deflector 38 is disposed within the hollow 26 defined by the inner surface 24 of the ball screw nut 22, and the portion of the body 40 that extends within the hollow 26 extends axially beyond the first and second resilient fingers 48, 50 in the first and second axial directions. In other words, the axial extremes of the portion of the deflector 38 that is disposed within the hollow 26 defined by the ball screw nut 22 in the first axial direction and the second axial direction are formed by the body 40 of the deflector 38, and the first and second resilient fingers 48, 50 are disposed, wholly axially inboard of these axial extremes of the deflector 38.

Referring still to FIGS. 4-9, movement of the deflector 38 from the uninserted position to the inserted position may prompt elastic deformation of the first and second resilient fingers 48, 50 from the at-rest conditions to the compressed conditions due to contact between the ball screw nut 22 and the first and second resilient fingers 48, 50. FIGS. 6-8 illustrate sequential movement of the deflector 38 from the uninserted position (FIG. 6) to the inserted position (FIG. 8). As illustrated in FIG. 6, in the uninserted position of the deflector 38, the first and second resilient fingers 48, 50 are initially in the at-rest conditions. With movement of the deflector 38 from the uninserted position toward the inserted position, the first and second resilient fingers 48, 50 are elastically deformed from at-rest conditions to compressed conditions due to contact between the first and second resilient fingers 48, 50 and the port 34. For example, as illustrated in FIG. 7, the first and second resilient fingers 48, 50 are in contact with the port 34 of the ball screw nut 22 as the deflector 38 is moved radially-inboard into the opening 36 defined by the port 34 toward the inserted position. As illustrated, the contact between the port 34 and the first and second resilient fingers 48, 50 causes the first and second resilient fingers 48, 50 to elastically deform from the at-rest conditions to the compressed conditions. This elastic deformation of the first and second resilient fingers 48, 50 to the compressed conditions allows the deflector 38 to continue moving radially-inboard into the opening 36 toward the inserted position. In various implementations, the first and second resilient fingers 48, 50 are shaped, such that radially-inboard movement of the deflector 38 toward the inserted position encourages elastic deformation of the first and second resilient fingers 48, 50 toward the compressed conditions without direct manipulation of the first and second resilient fingers 48, 50 aside from the contact between the ball screw nut 22 and the first and second resilient fingers 48, 50.

Referring now to FIGS. 7-9, as the deflector 38 is moved radially-inboard to the inserted position, the distal ends 52 of the first and second resilient fingers 48, 50 move radially-inboard beyond the port 34 that defines the opening 36 into the hollow 26 defined by the inner surface 24 of the ball screw nut 22. Having cleared the port 34 of the ball screw nut 22, the first and second resilient fingers 48, 50 then rebound back toward the at-rest conditions, securing the deflector 38 in the inserted position. In various embodiments, the distal ends 52 of the first and second resilient fingers 48, 50 are shaped such that, in the inserted position of the deflector 38, the distal ends 52 nest within the groove 30 of the inner surface 24 of the ball screw nut 22. In some embodiments, the contour of the distal ends 52 of the first and second resilient fingers 48, 50 may correspond with the contour of the groove 30 with which the distal ends 52 coincide. In other words, the distal ends 52 may have the negative shape of the groove 30.

Referring now to FIGS. 1 and 10, in operation of the ball screw assembly 10, the ball screw spindle 12 rotates about the axis 14. Rotation of the ball screw spindle 12 about the axis 14 drives circulation of the plurality of rollers 32 that are disposed radially between the ball screw spindle 12 and the ball screw nut 22 along the roller path 44. The roller path 44 includes the recirculation passage 42 defined by the deflector 38 and a portion of the raceway 20 defined cooperatively by the grooves 30 of the inner surface 24 of the ball screw nut 22 and the outer surface 16 of the ball screw spindle 12. Circulation of the plurality of rollers 32 along the roller path 44 due to rotation of the ball screw spindle 12 about the axis 14 prompts axial movement of the ball screw nut 22 along the ball screw spindle 12.

The ball screw assembly 10 of the present disclosure may provide a variety of advantages. First, the deflector 38 being operable to enter the inserted position via radially-inboard movement originating from outside of the opening 36 defined by the port 34 of the ball screw nut 22 may enhance the convenience of assembling the deflector 38 with the ball screw nut 22 relative to systems that require insertion of deflectors via radially-outboard movement. Second, the ball screw nut 22 and the deflector 38 being configured such that contact between the ball screw nut 22 and the first and second resilient fingers 48, 50 prompts elastic deformation of the first and second resilient fingers 48, 50 from the at-rest conditions to the compressed conditions (rather than a system that requires elastic deformation of a deflector prior to contacting a ball screw nut) may simplify and increase the efficiency of assembly of the ball screw assembly 10. Third, the head 46 of the body 40 of the deflector 38 and the first and second resilient fingers 48, 50 may cooperate to limit radially-inboard movement and radially-outboard movement of the deflector 38 in the inserted position of the deflector 38.

It is to be understood that variations and modifications can be made on the aforementioned structure without departing from the concepts of the present disclosure, and further it is to be understood that such concepts are intended to be covered by the following claims unless these claims by their language expressly state otherwise.

LIST OF REFERENCE NUMERALS

10 ball screw assembly
12 ball screw spindle
14 axis
16 outer surface of ball screw spindle
18 groove of ball screw spindle
20 raceway
22 ball screw nut
24 inner surface
26 hollow
28 outer surface of ball screw nut
30 groove of ball screw nut
32 rollers
34 port
36 opening
38 deflector
40 body recirculation
42 passage
44 roller path
46 head
48 first resilient finger second resilient
50 finger
52 distal end(s)
54 recesses

What is claimed is:

1. A ball screw assembly, comprising:

a ball screw nut having an inner surface that defines a hollow and includes a groove configured to define a raceway for a plurality of rollers and an outer surface opposite the inner surface, wherein the ball screw nut includes a port that defines an opening that extends through the ball screw nut from the outer surface of the ball screw nut to the inner surface;

a deflector that includes a body that defines a recirculation passage, a first resilient finger coupled to the body, and a second resilient finger coupled to the body, the deflector being operable to move from an uninserted position, wherein the deflector is disposed outside of the opening defined by the port of the ball screw nut, the first resilient finger is in an at-rest condition, and the second resilient finger is in an at-rest condition, to an inserted position, wherein the deflector extends within the opening defined by the port of the ball screw nut, the first resilient finger abuts a first portion of the groove of the inner surface of the ball screw nut, the second resilient finger abuts a second portion of the groove of the inner surface of the ball screw nut, and the deflector is positioned to recirculate the plurality of rollers, via the recirculation passage, along a portion of the groove disposed between the first and second portions of the groove, and wherein movement of the deflector from the uninserted position to the inserted position prompts elastic deformation of the first and second resilient fingers from the at-rest conditions to compressed conditions due to contact between the ball screw nut and the first and second resilient fingers, wherein, in the inserted position of the deflector, the body of the deflector extends axially beyond the first resilient finger in a first axial direction and a second axial direction opposite the first axial direction; and a ball screw spindle that extends within the hollow and includes a groove that cooperates with the groove of the inner surface of the ball screw nut to define the raceway, the ball screw spindle being operable to rotate about an axis, wherein rotation of the ball screw spindle about the axis drives circulation of the plurality of rollers along a roller path that includes the recirculation passage defined by the deflector and a portion of the raceway defined by the portion of the groove of the inner surface of the ball screw nut.

2. The ball screw assembly of claim 1, wherein the first and second resilient fingers return to the at-rest conditions when the deflector reaches the inserted position.

3. The ball screw assembly of claim 1, wherein the deflector moves radially inboard from the uninserted position to the inserted position, and wherein, in the inserted position of the deflector, contact between the first and second resilient fingers and the groove of the inner surface of the ball screw nut restricts radially-outboard movement of the deflector to the uninserted position.

4. The ball screw assembly of claim 3, wherein the body includes a head that contacts the ball screw nut in the inserted position of the deflector, such that radially-inboard movement of the deflector in the inserted position is restricted.

5. The ball screw assembly of claim 1, wherein, in the inserted position of the deflector, the body of the deflector extends axially beyond the second resilient finger in the first axial direction and the second axial direction.

6. The ball screw assembly of claim 5, wherein, in the inserted position of the deflector, a portion of the body of the deflector is disposed within the hollow defined by the inner surface of the ball screw nut, and the portion of the body of the deflector extends axially beyond the first and second resilient fingers in the first and second axial directions.

7. The ball screw assembly of claim 1, wherein the deflector is a single unitary body.

8. A ball screw assembly, comprising:

a ball screw spindle operable to rotate about an axis and having a groove that extends along an outer surface of the ball screw spindle;

a ball screw nut disposed about the ball screw spindle and having an inner surface that defines a hollow and that includes a corresponding groove that cooperates with the groove of the ball screw spindle to define a raceway between the ball screw spindle and the ball screw nut, the ball screw nut having an outer surface opposite the inner surface, wherein the ball screw nut includes a port that defines an opening that extends through the ball screw nut from the outer surface of the ball screw nut to the inner surface;

a plurality of rollers; and a deflector that includes a body that defines a recirculation passage and includes a head, a first resilient finger coupled to the body, and a second resilient finger coupled to the body, the deflector being disposed in an inserted position, wherein the deflector extends within the opening defined by the port of the ball screw nut, the head of the body is operable to interfere with the ball screw nut to limit radially-inboard movement of the deflector, and the first and second resilient fingers are operable to interfere with the inner surface of the ball screw nut to limit radially-outboard movement of the deflector, and wherein rotation of the ball screw spindle about the axis drives circulation of the plurality of rollers along a roller path that includes the recirculation passage defined by the deflector and a portion of the raceway, and axial movement of the ball screw nut along the ball screw spindle, wherein, in the inserted position of the deflector, the body of the deflector extends axially beyond the first resilient finger in a first axial direction and a second axial direction opposite the first axial direction.

9. The ball screw assembly of claim 8, wherein, in the inserted position of the deflector, the body of the deflector extends axially beyond the second resilient finger in the first axial direction and the second axial direction opposite the first axial direction.

10. The ball screw assembly of claim 9, wherein, in the inserted position of the deflector, a portion of the body of the deflector is disposed within the hollow defined by the inner surface of the ball screw nut, and the portion of the body of the deflector extends axially beyond the first and second resilient fingers in the first and second axial directions.

11. The ball screw assembly of claim 8, wherein the first and second resilient fingers are operable to pivot relative to the body inward toward the body to a compressed condition.

12. The ball screw assembly of claim 8, wherein the deflector is a single unitary body.

13. A ball screw assembly, comprising:

a ball screw nut having an inner surface that defines a hollow, an outer surface opposite the inner surface, and a port that defines an opening that extends through the ball screw nut from the outer surface to the inner surface; and a deflector having a body that defines a recirculation passage and first and second resilient fingers coupled to the body, the deflector being operable to move from an uninserted position, wherein the deflector is disposed outside of the opening, to an inserted position, wherein the deflector extends within the opening, and wherein, with movement of the deflector from the uninserted position to the inserted position, the first and second resilient fingers are elastically deformed from at-rest conditions to compressed conditions due to contact between the first and second resilient fingers and the port, and, subsequently, the first and second resilient fingers rebound back toward the at-rest conditions within the hollow as the deflector enters the inserted position, wherein, in the inserted position of the deflector, the body of the deflector extends axially beyond the first resilient finger in a first axial direction and a second axial direction opposite the first axial direction.

14. The ball screw assembly of claim 13, wherein the deflector is a single unitary body.

15. The ball screw assembly of claim 13, wherein the body includes a head that is operable to interfere with the ball screw nut to limit movement of the deflector into the hollow beyond the inserted position.

16. The ball screw assembly of claim 15, wherein the first and second resilient fingers rebound back to the at-rest conditions in the inserted position.

17. The ball screw assembly of claim 16, wherein, in the inserted position of the deflector, the first and second resilient fingers abut the inner surface of the ball screw nut to restrict movement of the deflector toward the uninserted position.

18. The ball screw assembly of claim 13, further comprising:

a ball screw spindle operable to rotate about an axis and having a groove that extends along an outer surface of the ball screw spindle.

19. The ball screw assembly of claim 13, further comprising:

a ball screw spindle that extends within the hollow and includes a groove that cooperates with the groove of the inner surface of the ball screw nut to define a raceway, the ball screw spindle being operable to rotate about an axis, wherein rotation of the ball screw spindle about the axis drives circulation of a plurality of rollers along a roller path that includes the recirculation passage defined by the deflector and a portion of the raceway defined by the portion of the groove of the inner surface of the ball screw nut.

* * * * *